No. 684,947. Patented Oct. 22, 1901.
S. E. OVIATT.
COUPLING AND SPRING FOR VEHICLES.
(Application filed Dec. 17, 1900.)
(No Model.)
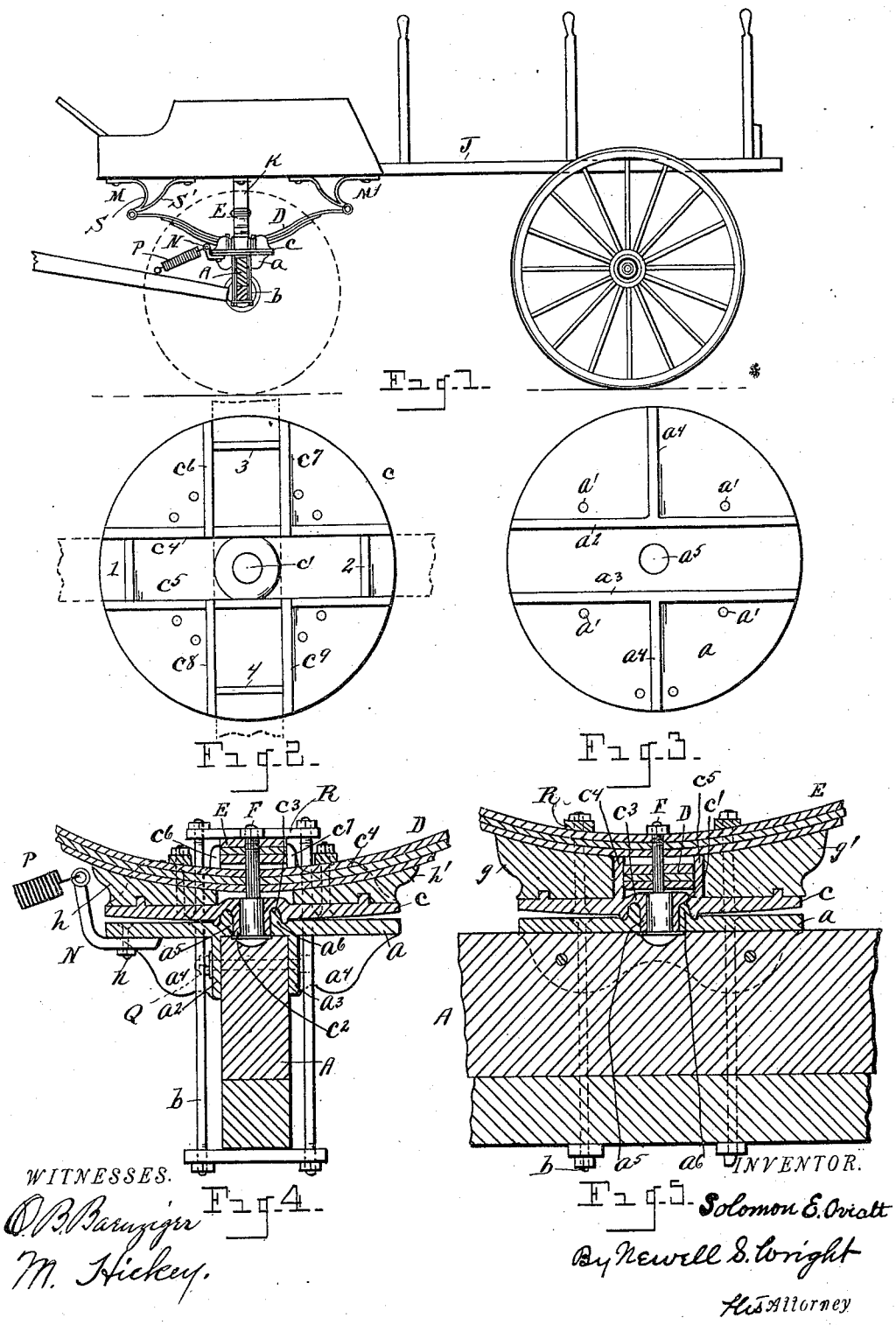

UNITED STATES PATENT OFFICE.

SOLOMON E. OVIATT, OF LANSING, MICHIGAN.

COUPLING AND SPRING FOR VEHICLES.

SPECIFICATION forming part of Letters Patent No. 684,947, dated October 22, 1901.

Application filed December 17, 1900. Serial No. 40,111. (No model.)

*To all whom it may concern:*

Be it known that I, SOLOMON E. OVIATT, a citizen of the United States, residing at Lansing, county of Ingham, State of Michigan, have invented a certain new and useful Improvement in Couplings and Springs for Vehicles; and I declare the following to be a full, clear, and exact description of the invention, such as will enable others skilled in the art to which it appertains to make and use the same, reference being had to the accompanying drawings, which form a part of this specification.

My invention is designed to provide an improved coupling and spring for vehicles, the object of my invention being to provide apparatus of this character of superior utility and simplicity.

My invention consists of the construction, combination, and arrangement of devices hereinafter specified and claimed, and illustrated in the accompanying drawings, in which—

Figure 1 is a view in side elevation. Fig. 2 is a plan view of the upper plate. Fig. 3 is an inverted plan view of the lower or axle plate. Fig. 4 is a longitudinal vertical section transversely of the axle and axle-bed. Fig. 5 is a vertical section at right angles to that shown in Fig. 4.

I carry out my invention as follows:

In the drawings, $a$ represents a lower axle-plate or fifth-wheel, the same being rigidly engaged with the axle-bed A or with the axle in any suitable manner, as by bolts or clips $b$, the said axle-plate being provided with orifices $a'$ to receive the adjacent extremity of the bolts or clips. The under side of the axle-plate is also constructed with depending flanges $a^2 a^3$ to rest over the axle-bed or axle. It will be understood that where a wooden axle is employed the said plate will be engaged upon the axle. Where a metal axle is employed with an axle-bed, said flanges would rest astride said bed. The under side of the plate is also preferably constructed with strengthening-ribs $a^4$. While I do not limit myself to any particular shape of the plate, I prefer to construct it of circular form. Said axle-plate is also constructed with a central orifice $a^5$, the plate being constructed with an upwardly-projecting hub or flange $a^6$ about said orifice.

My invention embodies also an upper plate $c$, corresponding in form or outline to that of the axle-plate, said upper plate formed with a central orifice $c'$, preferably having a depending hub $c^2$ about said orifice extending through the orifice in the lower plate. The under surface of the upper plate $c$ is recessed also, as indicated at $c^3$, to receive the upwardly-projecting hub of the axle-plate. The upper surface of the plate $c$ is formed with transverse flanges $c^4 c^5$ to receive a spring D, said transverse flanges serving to rigidly hold the spring from lateral movement. The upper face of the plate $c$ is also constructed with upwardly-projecting flanges $c^6 c^7$ and $c^8 c^9$, extending from the flanges $c^4 c^5$ radially toward the periphery of the plate, the flanges $c^6 c^7$ and $c^8 c^9$ projecting above the upper edge of the flanges $c^4 c^5$ to receive an additional spring E and hold said spring from lateral movement, said spring thus extending at right angles, the one crossing the other upon the upper plate $c$. Said springs are formed with orifices registering with the orifices in the plates $a$ and $c$, so that a bolt F may extend through both said plates and through both of said springs to unite said plates and said springs and hold all of the parts properly together. The bolt F, it will be seen, serves as a king-bolt and might extend through the axle or axle-bed, if desired, although it is preferred not to extend said bolt through the axle or axle-bed. Between the flanges $c^6 c^7$ and $c^8 c^9$ are filling-blocks $g g'$ to form supports for the spring E. Instead of employing said blocks, however, the plate itself might obviously be cast with integral supports to serve the same purpose. The wooden blocks $g g'$, however, are preferred for this purpose. So, also, between the flanges $c^4 c^5$, at both extremities thereof, are located blocks $h h'$ to form a suitable support for the spring D, said blocks being of suitable shape to form the support of the spring. Instead of employing the blocks $h h'$ also the plate may obviously be thickened to furnish suitable supports; but here also I prefer to employ wooden blocks for this purpose. To prevent endwise movement of said blocks $g g'$ and h h', the plate c is provided with ribs 1 2 3 4, raised on the upper surface of the plate, as shown, to fit into the corresponding recesses in said blocks.

A vehicle-bed is indicated at J. My invention contemplates engaging with the under side of said bed side springs K, secured at their inner extremities to said bed in any suitable manner. The extremities of the springs K are engaged with the extremities of the spring E in any customary manner. To the bed of the vehicle are also engaged front and rear terminal springs M and M', said springs being attached to the vehicle-bed in any suitable manner at their inner ends, their outer ends being engaged with the outer ends of the corresponding spring engaged with the plate c. It makes no special difference in my invention whether the spring D or the spring E is located the one below the other or which of said springs is engaged with the corresponding springs of the bed, although I prefer that the spring which takes the most draft should extend longitudinally with the bed of the vehicle and pass underneath the transverse spring. I prefer that the springs attached to the bed of the vehicle should be united with the corresponding springs D E with a jointed connection. It will be obvious that by using the said side springs and the said forward and rear springs connected with the corresponding extremities of the springs D E, I form practically an elliptic spring, and at the same time I am enabled to shorten the upper portions of the spring and dispense thereby with various complications and obstacles which would otherwise arise, thereby also cheapening the construction.

To flexibly support the tongue, an arm N may be attached to the axle-plate in any suitable manner, as by bolts or rivets n, said arm extending upwardly as high as the longitudinal spring will permit, a spring P of any suitable construction being engaged with the upper end of said arm and with the tongue.

While I prefer the use of a king-bolt to unite the two plates and to unite the springs also thereto, my invention contemplates, however, attaching the springs to the upper plate in any suitable manner and also uniting the two plates in any suitable manner, so that the upper plate will be revoluble upon the lower plate.

It is evident that the draft of the vehicle comes upon the spring E. By this construction, however, the strain is distributed over a broad base, the side springs above described being connected with the sides of the vehicle-bed, while the forward and rear springs connected with the longitudinal spring upon the upper plate are attached to the bed intermediate the sides thereof and longitudinally therewith. By this means, it will be observed, a reach may be entirely dispensed with, providing for a short turn especially desired in platform-wagons.

I desire to construct the bearings of the two plates close to the center, a slight rocking of the plates being provided for the one upon the other. By this construction it will be obvious that since the bearing of the plates is near the center the tongue has a strong leverage and easily directs the oscillation of the plates one upon the other, avoiding features so objectionable in vehicles of other construction.

The axle-plate may be bolted to the axle-bed by means of horizontal bolts, (indicated at Q.) I prefer also to secure the springs to the upper plate by means of a clip R in addition to the employment of the king-bolt already described. The springs engaged with the bed of the vehicle at their inner ends I prefer to form with leaves extending in opposite directions, as indicated at S S', Fig. 1. It will be understood that the side springs projecting laterally from the bed will be of similar construction.

What I claim as my invention is—

1. The combination with an axle-plate, of an upper plate revoluble thereon provided on its upper surface with two sets of parallel transverse flanges, the one set extending at right angles to the other set, and springs supported upon the upper plate between said flanges, one of said springs crossing the other spring at right angles.

2. The combination with an axle-plate, of an upper plate revoluble thereon, provided on its upper surface with two sets of parallel transverse flanges, the one set extending at right angles to the other set, and springs supported upon the upper plate between said flanges, and a bolt uniting said plates and springs.

3. The combination with an axle-plate, of an upper plate revoluble thereon provided with transverse flanges, springs crossing one another supported upon the upper plate, and blocks secured upon the upper plate between said flanges to support said springs.

4. The combination with an axle-plate, an upper plate revoluble thereon provided with transverse flanges, springs crossing one another supported upon the upper plate between said flanges, blocks secured upon the upper plate to support said springs, and means to hold said blocks in place.

5. The combination with an axle-plate, of an upper plate revoluble thereon, said plate provided with transverse flanges, and with flanges extending at right angles to the transverse flanges, springs crossing one another between the respective flanges, and means to hold the springs in engagement with the upper plate.

6. In a coupling and spring for vehicles, the combination with an axle-plate, of an upper plate revoluble thereon provided on its upper surface with two sets of parallel transverse flanges, the one set extending at right angles to the other set, and springs supported upon the upper plate between said flanges, and additional springs engaged with the bed of the vehicle united to the extremities of the spring supported upon the upper plate.

7. In a coupling and spring for vehicles, the combination with an axle-plate, of an upper plate revoluble thereon provided on its upper surface with two sets of parallel transverse flanges, the one set extending at right angles to the other set, springs supported upon the upper plate between said flanges, and side springs engaged at their inner ends with the bed of the vehicle, and at their outer ends with the extremities of the springs supported upon the upper plate.

8. In a coupling and spring for vehicles, the combination with an axle-plate, of an upper plate revoluble thereon, springs crossing one another supported upon the upper plate, the one extending transversely of the bed of the vehicle, and the other extending longitudinally of the bed of the vehicle, forward and rear springs connected at one end with the bed of the vehicle and at their opposite ends with the extremities of the longitudinal spring, and springs connected at one extremity with the bed of the vehicle, and at their opposite ends with the extremities of the transverse springs.

9. In a coupling and spring for vehicles provided with a bed and axle, the combination of a revoluble plate supported upon the axle, a spring extending transversely of said bed supported upon said plate, a spring extending longitudinally of said bed supported upon said plate and crossing the transverse spring at right angles thereto, means to hold said springs in place upon said plate, additional forward and rear springs connected at one end thereof, respectively, with the bed of the vehicle, and at the opposite ends thereof with the extremities of the longitudinal spring, and side springs connected at one end thereof, respectively, with the bed of the vehicle, and at their opposite ends with the extremities of the transverse springs.

In testimony whereof I sign this specification in the presence of two witnesses.

SOLOMON E. OVIATT.

Witnesses:
  N. S. WRIGHT,
  M. HICKEY.